(12) United States Patent
Reller et al.

(10) Patent No.: US 9,229,525 B2
(45) Date of Patent: Jan. 5, 2016

(54) ADAPTIVE LATENCY TOLERANCE FOR POWER MANAGEMENT OF MEMORY BUS INTERFACES

(71) Applicant: Apple Inc., Cupertino, CA (US)

(72) Inventors: Idan Reller, Petach-Tikva (IL); Rachel Menes, Tel Aviv (IL); Arie Peled, Tel-Mond (IL); Guy Kushtai, Ra'anana (IL)

(73) Assignee: Apple Inc., Cupertino, CA (US)

( * ) Notice: Subject to any disclaimer, the term of this patent is extended or adjusted under 35 U.S.C. 154(b) by 338 days.

(21) Appl. No.: 13/919,213

(22) Filed: Jun. 17, 2013

(65) Prior Publication Data

US 2014/0372777 A1 Dec. 18, 2014

(51) Int. Cl.
*G06F 1/32* (2006.01)
*G06F 13/42* (2006.01)

(52) U.S. Cl.
CPC .......... *G06F 1/3253* (2013.01); *G06F 13/4234* (2013.01)

(58) Field of Classification Search
CPC G06F 1/3253; G06F 13/4243; G06F 13/4234
See application file for complete search history.

(56) References Cited

U.S. PATENT DOCUMENTS

| 8,255,713 | B2 | 8/2012 | Jeyaseelan et al. | |
|---|---|---|---|---|
| 8,601,296 | B2 | 12/2013 | Jeyaseelan et al. | |
| 2003/0088797 | A1* | 5/2003 | Gaur | 713/300 |
| 2011/0016283 | A1* | 1/2011 | Davis et al. | 711/170 |
| 2013/0007489 | A1 | 1/2013 | Unnikrishnan et al. | |
| 2013/0343250 | A1 | 12/2013 | Homchaudhuri et al. | |
| 2014/0082242 | A1 | 3/2014 | Murphy et al. | |
| 2014/0095944 | A1 | 4/2014 | Alexander et al. | |
| 2014/0195833 | A1* | 7/2014 | Wang et al. | 713/320 |

* cited by examiner

*Primary Examiner* — Stefan Stoynov
(74) *Attorney, Agent, or Firm* — Meyertons, Hood, Kivlin, Kowert & Goetzel, P.C.

(57) ABSTRACT

A method includes, in a memory system that includes a host and a storage device connected by a bus interface, assessing in the storage device a power supply state of the memory system. In the storage device a latency tolerance is selected for the bus interface based on the assessed power supply state. The selected latency tolerance is indicated from the storage device to the host, for application to the bus interface.

20 Claims, 1 Drawing Sheet

ADAPTIVE LATENCY TOLERANCE FOR POWER MANAGEMENT OF MEMORY BUS INTERFACES

FIELD OF THE INVENTION

The present invention relates generally to memory systems, and particularly to methods for power management in memory bus interfaces.

BACKGROUND OF THE INVENTION

Peripheral Component Interconnect Express (PCIe) is a high speed bus interface, which can connect a host system processor unit with integrated peripherals, such as solid state drives (SSD). The features and specifications of the PCIe bus interface are described, for example, in "PCI Express Base Specification," revision 3.0, Nov. 10, 2010, and in an Engineering Change Notice (ECN) of the PCI Special Interest Group (SIG), entitled "L1 PM Substates with CLKREQ," Aug. 23, 2012, which are incorporated herein by reference.

SUMMARY OF THE INVENTION

An embodiment of the present invention described herein provides a method including, in a memory system that includes a host and a storage device connected by a bus interface, assessing in the storage device a power supply state of the memory system. In the storage device, a latency tolerance is selected for the bus interface based on the assessed power supply state. The selected latency tolerance is indicated from the storage device to the host, for application to the bus interface.

In some embodiments, the bus interface has multiple power-saving states that are selectable by the host, and selecting the latency tolerance includes causing the host to select a power-saving state for the bus interface only from a subset of the power-saving states that comply with the latency tolerance. In other embodiments, the bus interface includes a Peripheral Component Interconnect Express (PCIe) bus interface, and selecting the subset of the power-saving states includes causing the host to select one mode from a set of Active State Power Management (ASPM) modes for the PCIe bus interface. In yet other embodiments, assessing the power supply state includes assessing whether the memory system is connected to external power supply.

In some embodiments, assessing the power supply state includes assessing an energy level of a battery that powers the memory system. In other embodiments, selecting the latency tolerance includes setting or causing the host to set, based on the latency tolerance, a delay before entering a power-saving state of the bus interface. In yet other embodiments, selecting the latency tolerance includes causing the host to select whether to allow clock gating in the bus interface.

In some embodiments, the bus interface has an adjustable data rate that is selectable by the host, and selecting the latency tolerance includes causing the host to select a data rate that complies with the latency tolerance. In other embodiments, causing the host to select the data rate includes causing the host to modify a number of active lanes of the bus interface. In yet other embodiments, causing the host to select the data rate includes causing the host to modify a link speed of the bus interface.

There is additionally provided herein, in accordance with an embodiment of the invention, an apparatus including a host interface and a processor. The host interface is configured to communicate with a host over a bus interface. The processor is configured to assess a power supply state of a memory system that includes the host and the apparatus, to select a latency tolerance for the bus interface based on the assessed power supply state, and to indicate the selected latency tolerance to the host, for application to the bus interface.

There is additionally provided herein, in accordance with an embodiment of the invention, a memory system including a host and a storage device. The storage device is configured to communicate with the host over a bus interface, to assess a power supply state of the memory system, to select a latency tolerance for the bus interface based on the assessed power supply state, and to indicate the selected latency tolerance to the host, for application to the bus interface.

The present invention will be more fully understood from the following detailed description of the embodiments thereof, taken together with the drawings in which:

DETAILED DESCRIPTION OF EMBODIMENTS

Overview

In many memory systems, a host communicates with a storage device over a bus interface. For high data throughput in the storage device, the system should provide short latencies in the data transfer between the host and the storage device over the bus. When the memory system is a mobile computing device, for example, operating from a battery power supply, the consumed power budget among the different elements of the system (e.g., host, storage device and bus interface) is critical for long battery life. PCIe bus links are typically configured to operate in different power-saving states which reduce power consumption but increase latency. The PCIe bus interface consumes the highest power when operating in the lowest latency state.

Embodiments of the present invention that are described herein provide methods and systems for trading-off between power consumption and latency in bus interfaces such as PCIe. In the disclosed embodiments, the storage device assesses the power supply state (e.g., battery energy level and/or whether external power is available), selects a latency tolerance for the bus interface based on the assessed power supply state, and indicates the latency tolerance to the host. The host then applies the latency tolerance to the bus interface in order to adaptively manage the power consumed by the bus interface.

For example, if the battery energy level is very low, the storage device allows the host to operate with higher latency so as to conserve battery power. Conversely, if the battery is full or the memory system is connected to external power supply, the storage device requests the host to operate the bus interface with the lowest latency, at the possible expense of higher power consumption.

In a first embodiment presented herein, the host limits the selection possibilities of the power-saving mode for the PCIe bus interface (and possibly other host resources), based on the latency tolerance selected by the storage device. In a second embodiment, the host may select to throttle down the data rate of the PCIe link based on the latency tolerance. The host may throttle down the data rate by reducing the number of active PCIe lanes over which the PCIe bus can operate, or by reducing the link speed (baud rate).

In some embodiments, the host may also select to set power saving modes within other host resources in response to the latency tolerance reported by the storage device. The host may further relay the latency tolerance to any suitable resource in system 32 (e.g., a Random Access Memory (RAM), central processing unit (CPU) cache or phase locked loop (PLL)) for initiating power saving modes in response to the latency tolerance reported by the storage device.

The tradeoff between latency tolerance and power consumption of the bus interface as provided by the embodiments presented herein effectively match the power consumption of the bus interface to the power supply state.

System Description

Figure 1:
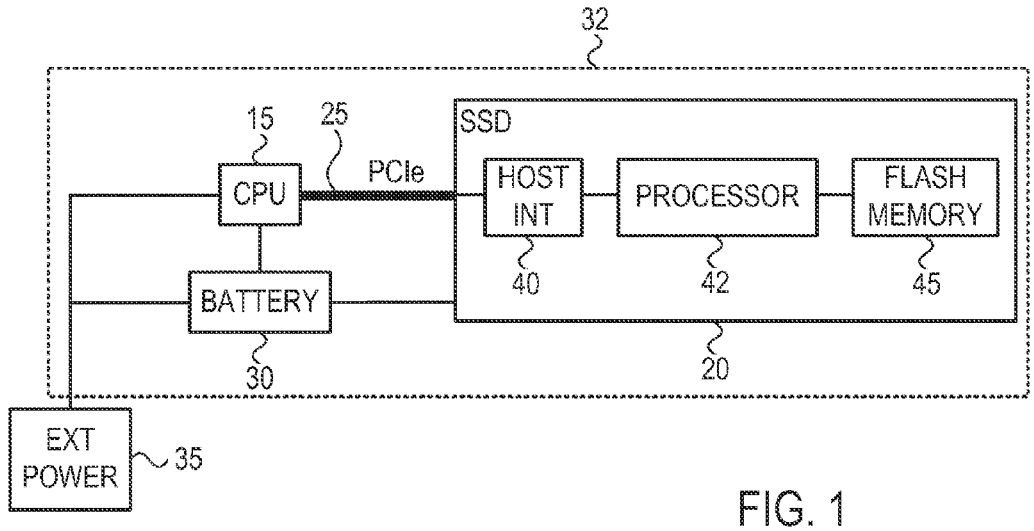
FIG. 1 is a block diagram that schematically illustrates a memory system, in accordance with an embodiment of the present invention.

FIG. 1 is a block diagram that schematically illustrates a memory system 32, in accordance with an embodiment of the present invention. System 32 comprises a host, in the present example a central processing unit (CPU) 15, connected to a storage device, in the present example a solid state drive (SSD) 20, by a PCIe bus interface 25 (shown as a bold line in FIG. 1). SSD 20 comprises a host interface 40 and an SSD processor 42, which are configured to relay data between CPU 15 and a Flash memory 45. Bus interface 25 is also referred to herein as a memory bus interface or memory interface.

The disclosed techniques can be applied in various types of memory systems 32, for example personal computers, enterprise storage systems, mobile phones, digital cameras, media players, removable memory cards or devices, and many others. Memory system 32 can be powered either by a battery 30, or alternatively by an external power source 35, which may also be used to charge battery 30.

SSD 20 stores data for CPU 15 in non-volatile memory, typically NAND Flash memory 45. In alternative embodiments, the non-volatile memory in SSD 20 may comprise any other suitable type of non-volatile memory, such as, for example, NOR Flash, Charge Trap Flash (CTF), Phase Change RAM (PRAM), Magneto-resistive RAM (MRAM) or Ferroelectric RAM (FeRAM).

The configuration of FIG. 1 is an exemplary configuration, which is shown purely for the sake of conceptual clarity, and not by way of limitation of the embodiments of the present invention. Any other suitable host and/or storage device configuration can also be used. Bus interface 25 is shown in FIG. 1 as a PCIe bus interface, but any suitable bus interface may be used to connect the host (e.g., CPU 15) to SSD 20 in system 32.

Moreover in the exemplary system configuration shown in FIG. 1, SSD processor 42 and Flash memory 45 are implemented as separate units. In alternative embodiments, however, SSD processor 42 and Flash memory 45 may be integrated on separate semiconductor dies in a single Multi-Chip Package (MCP) or System on Chip (SoC), and may be interconnected by an internal bus. Further alternatively, some of the functionality of SSD processor 42 can be implemented in software and carried out by CPU 15 or any other suitable processor. In some embodiments, CPU 15 and SSD 20 may be fabricated on the same die, or on separate dies in the same device package.

Alternatively, processor 42 and/or CPU 15 may comprise a microprocessor that runs suitable software, or a combination of hardware and software elements. In some embodiments, processor 42 and/or CPU 15 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Adaptive Latency Tolerance for a PCIe Bus Interface

The data sent over bus interface 25 between CPU 15 and SSD 20 exhibits certain latency. In some embodiments, resources in system 32 (e.g., the individual system component blocks shown in FIG. 1, and host resources not shown, such as DRAM and cache accesses) may be notified and updated as to how much latency can be tolerated in order for system 32 to operate efficiently.

In the embodiments of the present invention described herein, the power consumption of PCIe bus 25 is controlled by changing the latency tolerance of SSD 20 in response to the power supply state. SSD 20 assesses the power supply state, selects the latency tolerance for the PCIe bus interface based on the assessed power supply state, and indicates the selected latency tolerance to CPU 15 for application to the PCIe bus so as to tradeoff latency for reduced power consumption.

For each of the example embodiments described herein, the CPU controls the PCIe link by relaying selected control parameters to be applied to the PCIe bus which comply with the indicated latency tolerance. In a first embodiment, CPU 15 selects a power-saving mode of the PCIe bus based on the latency tolerance. In second embodiment, CPU 15 may select to throttle the data rate, or PCIe link speed, based on the latency tolerance to conserve power. In yet a third embodiment, CPU 15 may reduce the number of active PCIe lanes over which to communicate in order to throttle the data rate to save power, as will be described in detail later.

The power supply state (e.g., presence or absence of external power, or battery energy level indication) is typically provided to processor 42 by CPU 15. The CPU may send the power supply state to the SSD, for example, via the PCIe link itself, or over a universal serial bus (USB) or universal asynchronous receiver/transmitter (UART), or by any other suitable method.

Adaptive Latency Tolerance using PCIe Power-Saving Modes

In the first embodiment, the PCIe bus interface is configured to have a set of multiple power-saving states known as Active State Power Management (ASPM) modes, which can be controlled by the host. The ASPM power-saving states are denoted as L0, L1.0, L1.1, and L1.2 in the PCIe Base Specification and the "L1 PM Substates with CLKREQ" documents cited above.

Each ASPM state is characterized has a certain power consumption and a certain wake-up latency (i.e., a certain latency in transitioning from power-save to normal operation). In the ASPM states, wake-up delay is inversely-related to power consumption. In other words, deep power saving incurs large wake-up delay, and vice versa.

The host can reduce power consumption by selecting a low-power ASPM state from among the multiple power-saving states of the PCIe link. Among the ASPM modes, only in mode L0 can data still be communicated through the PCIe bus. As the host selects power-saving modes (e.g., L1.0, L1.1, and L1.2) with even lower power consumption, the latency is progressively longer when the PCIe wakes up from these power saving modes and starts to transition back to L0 where data can be transferred between CPU 15 and SSD 20.

Figure 2:
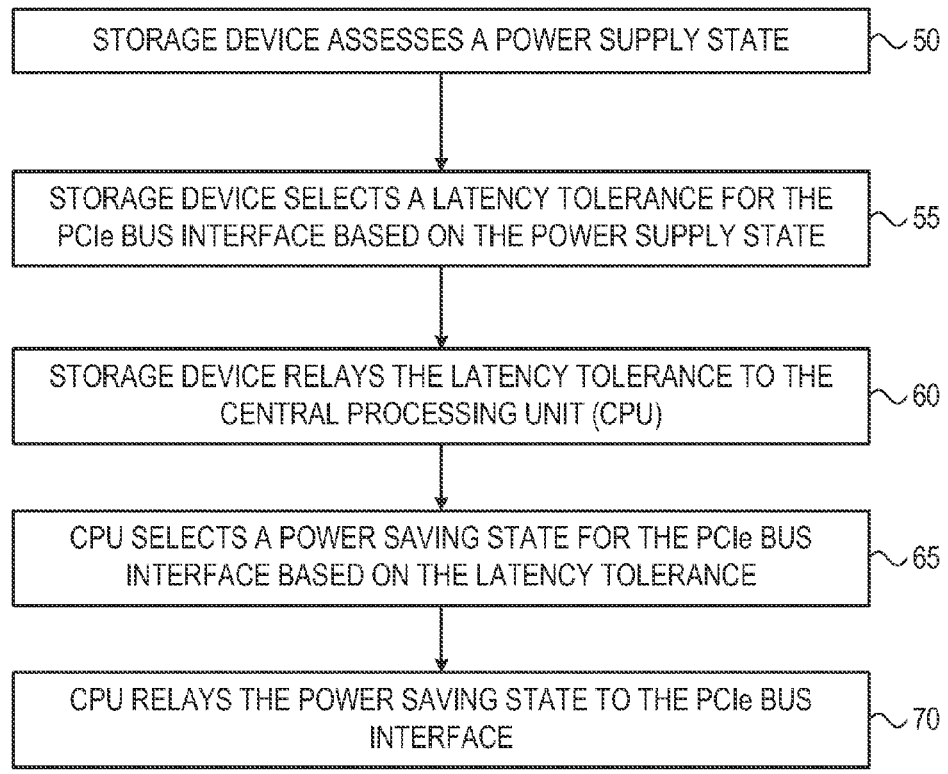
FIG. 2 is a flow chart that schematically illustrates a method for selecting a power saving state for a bus interface, in accordance with an embodiment of the present invention.

FIG. 2 is a flow chart that schematically illustrates a method for selecting power saving states in bus interface 25, in accordance with an embodiment of the present invention. In an assessing step 50, processor 42 in storage device 20 assesses a power supply state.

In a selecting step 55, storage device 20 selects a latency tolerance for PCIe bus interface 25 based on the assessed power supply state. In a relaying step 60, storage device 20 relays the latency tolerance to central processing unit (CPU) 15. The storage device may relay the latency tolerance, for example, using the Latency Tolerance Reporting (LTR) mechanism defined in the PCIe Base Specification cited above.

In a selecting step 65, CPU 15 selects a power saving state for the PCIe interface based on the latency tolerance. In a relaying step 70, CPU 15 relays the power saving state to PCIe bus interface 25. CPU 15 may also use the reported latency tolerance of the storage device to save power in other resources, e.g., in the CPU chipset itself. For example, the CPU chipset may comprise components such as Phase Locked Loop (PLL) and Dual Data Rate (DDR) memory. When a large LTR is reported by the storage device, CPU 15 may relay this information to additional components and save additional power.

Typically, CPU 15 restricts the selection of power-saving states to a partial subset of the possible power saving states that comply with the latency tolerance reported by processor 42 of SSD 20. For example, if SSD 20 detects that system 32 is connected to external power supply 35 in step 50, a very low latency is selected in step 55 so as to keep the throughput and response delay of SSD 20 as high as possible. A low latency tolerance is indicated to the host in step 60 and thus, CPU 15 will not allow PCIe to enter any of the ASPM modes in step 70.

If SSD 20 detects that system 32 is not connected to external power but the battery is still full or almost full, SSD 20 indicates to the host that a low latency tolerance is still required, but not as low as in the previous case. In response, CPU 15 may allow PCIe bus 25 to enter ASPM states L0 and L1.0, but not L1.1 and L1.2. In addition, CPU 15 may allow PCIe bus 25 to enter the power-saving state only after a relatively long entry latency, e.g., enter L0 only after 32 μsec, or enter L1.0 only after 256 μsec. Further additionally, CPU 15 may not permit clock gating in this scenario. In other embodiments, the entry latency of PCIe bus 25 may be controlled by processor 42.

If SSD 20 detects that external power is not connected, and that the energy level of battery 30 is very low, SSD 20 indicates to the host in step 60 that a high latency tolerance is needed so as to conserve power. CPU 15 may aggressively request PCIe bus 25 to enter any of the aforementioned ASPM modes in step 65 and step 70. The idle times for entering the ASPM modes may are also be configured to be much shorter, for example, 2 μsec of idle time to enter the L1.0, L1.1, and L1.2 states. In addition to the ASPM modes, CPU 15 may request the PCIe bus to also enter clock gating modes which further reduce power by clock gating of the associated clock signals of the PCIe bus. Moreover, when the sensed battery storage level is critically low, the host may not change the latency requirements even if there is an impact on throughput and overall performance, so as to conserve battery power.

It is important to distinguish between selection of the subset of permitted power-saving states (decided by the CPU based on the latency tolerance reported by the storage device) and the actual selection event to move from one state to another (decided by the storage device, from among the subset of permitted power-saving states).

For example, CPU 15 may allow/prohibit the SSD to enter L0s or L1.0 by sending a Config-Write [CfgWr] to the SSD. If L0s/L1.0 states are enabled, the entry event to these states is decided solely by the SSD. CPU 15 has no control over the timing or initiation of state transitions. For example, when the PCIe link is in L1.0, the CPU may prevent the link from going into a lower power state by keeping CLKREQ asserted. The CPU may also prevent the PCIe link from entering L1.1/L1.2 by prohibiting the SSD from entering them, by sending a [CfgWr] when the link is in L0, i.e., before entering L1.0. Regarding entering L0s/L1.0, the SSD may change its entry delay according to the message it received from the CPU regarding the battery state.

The above-mentioned power-saving scenarios are depicted by way of example and not by limitation of the embodiments of the present invention. Any power-saving mode, idle time, or any suitable combinations of the aforementioned parameters thereof may be used.

Reduction of PCIe Link Data Rate

In the second embodiment, CPU 15 throttles the link speed (baud rate) of PCIe bus 25 based on the latency tolerance reported by SSD 20. Reducing the link speed is regarded herein as one possible way of reducing the data rate on PCIe bus 25. Upon receiving a high latency tolerance indication from SSD 20, CPU 15 requests PCIe bus 25 to reduce the link speed in order to reduce power consumption. Upon receiving a low latency tolerance indication, the CPU increases the link speed of the PCIe bus. In other embodiments, CPU 15 may not wait for the latency tolerance indication to throttle the link speed.

For example, a Gen3 PCIe bus interface operates at 8 Gbps and can be requested to run on the legacy Gen1 rate of 2.5 Gbps as defined in the previously cited documents. CPU 15 may operate such a bus interface at the full 8 Gbps speed or at the lower 2.5 Gbps speed depending on the latency tolerance indication received from SSD 20. This sort of solution is beneficial when the PCIe bus is configured such that reducing the link speed results in a linear reduction in power consumption, or better. Otherwise, the power consumption per bit may deteriorate rather than improve.

In a third embodiment, CPU 15 modifies the power consumption and data rate by reducing or increasing the number of active lanes in the PCIe bus interface as described in the cited documents. For example, when using a PCIe bus comprising four lanes, the CPU can deactivate three of the four lanes. Then, communication over the PCIe bus is by use of one lane only, which proportionally reduces the static power consumption by ~75% for this case. This example is purely for conceptually clarity and not by way of limitation of the embodiments of the present invention. A PCIe device with any number of lanes can be used and any suitable number of lanes can be deactivated so as to conserve power.

Further alternatively, CPU 15 may change the data rate of PCIe bus 25 in any other suitable way in response to the latency tolerance reported by SSD 20.

Although the embodiments described herein mainly address solid state drives, the methods and systems described herein can also be used with other devices communicating with a host over a bus interface such as in a camera, a Bluetooth device or a wireless network device.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a memory system that includes a host and a storage device connected by a bus interface, assessing, by the storage device, a power supply state of the memory system;
   determining, by the storage device, a latency tolerance for the bus interface based on the assessed power supply state;
   indicating the selected latency tolerance from the storage device to the host via the bus interface;
   selecting, by the host, a subset of power-saving states that comply with the latency tolerance from a plurality of power-saving states; and
   selecting, by the storage device, a given power-saving state from the subset.

2. The method according to claim 1, further comprising preventing, by the host, the storage device from selecting a power-saving state excluded from the subset of the power-saving states that comply with the latency tolerance.

3. The method according to claim 1, wherein the bus interface comprises a Peripheral Component Interconnect Express (PCIe) bus interface, and wherein selecting the subset of the power-saving states comprises causing the host to select one mode from a set of Active State Power Management (ASPM) modes for the PCIe bus interface.

4. The method according to claim 1, wherein assessing the power supply state comprises assessing whether the memory system is connected to an external power supply.

5. The method according to claim 1, wherein assessing the power supply state comprises assessing an energy level of a battery that powers the memory system.

6. The method according to claim 1, further comprising selecting, by the storage device, a period of time to delay before entering the given power-saving state of the bus interface.

7. The method according to claim 1, further comprising allowing, by the host, clock gating in the bus interface dependent upon the latency tolerance.

8. The method according to claim 1, further comprising selecting, by the host, a data rate for the bus interface that complies with the latency tolerance.

9. The method according to claim 8, wherein selecting the data rate comprises modifying a number of active lanes of the bus interface.

10. The method according to claim 8, wherein selecting the data rate comprises modifying a link speed of the bus interface.

11. An apparatus, comprising:
    a host interface, which is configured to communicate with a host over a bus interface; and
    a processor, which is configured to:
       assess a power supply state of a memory system that comprises the host and the apparatus;
       determine a latency tolerance for the bus interface based on the assessed power supply state;
       indicate the selected latency tolerance to the host, to via the bus interface;
       receive via the bus interface, a subset of power-saving states chosen, by the host, from a plurality of power-saving states; and
       select a given power-saving state from the subset.

12. A memory system, comprising:
    a host; and
    a storage device configured to:
       communicate with the host over a bus interface;
       assess a power supply state of the memory system;
       determine a latency tolerance for the bus interface based on the assessed power supply state; and
       indicate the selected latency tolerance to the host via the bus interface;
    wherein the host is configured to select a subset of power-saving states that comply with the latency tolerance from a plurality of power-saving states; and
    wherein the storage device is further configured to select a given power-saving state from the subset.

13. The memory system according to claim 12, wherein the host is further configured to prevent the storage device from selecting a power-saving state excluded from the subset of the power-saving states that comply with the latency tolerance.

14. The memory system according to claim 12, wherein the bus interface comprises a Peripheral Component Interconnect Express (PCIe) bus interface, and wherein to select the subset of power-saving states, the host is further configured to select a subset of modes from a set of Active State Power Management (ASPM) modes for the PCIe bus interface.

15. The memory system according to claim 12, wherein to assess the power supply state of the memory system, the storage device is further configured to determine if the memory system is connected to an external power supply.

16. The memory system according to claim 12, wherein to assess the power supply state of the memory system, the storage device is further configured to determine an energy level of a battery that powers the memory system.

17. The memory system according to claim 12, wherein the host is further configured to send a value indicative of a period of time to delay before entering the power-saving state to the storage device, wherein the value is dependent upon the latency tolerance.

18. The memory system according to claim 12, wherein the host is further configured to enable clock gating in the bus interface dependent upon the latency tolerance.

19. The memory system according to claim 12, wherein the bus interface includes an adjustable data rate that is selectable by the host, and wherein the host is further configured to select a data rate that complies with the latency tolerance.

20. The memory system according to claim 12, wherein the host is further configured to modify at least one parameter selected from a group of parameters, wherein the group of parameters includes a link speed and a number of active lanes of the bus interface.

* * * * *